Oct. 15, 1940.   C. S. BRAGG   2,217,940
CLUTCH CONTROL MECHANISM
Filed Nov. 19, 1932   3 Sheets-Sheet 2
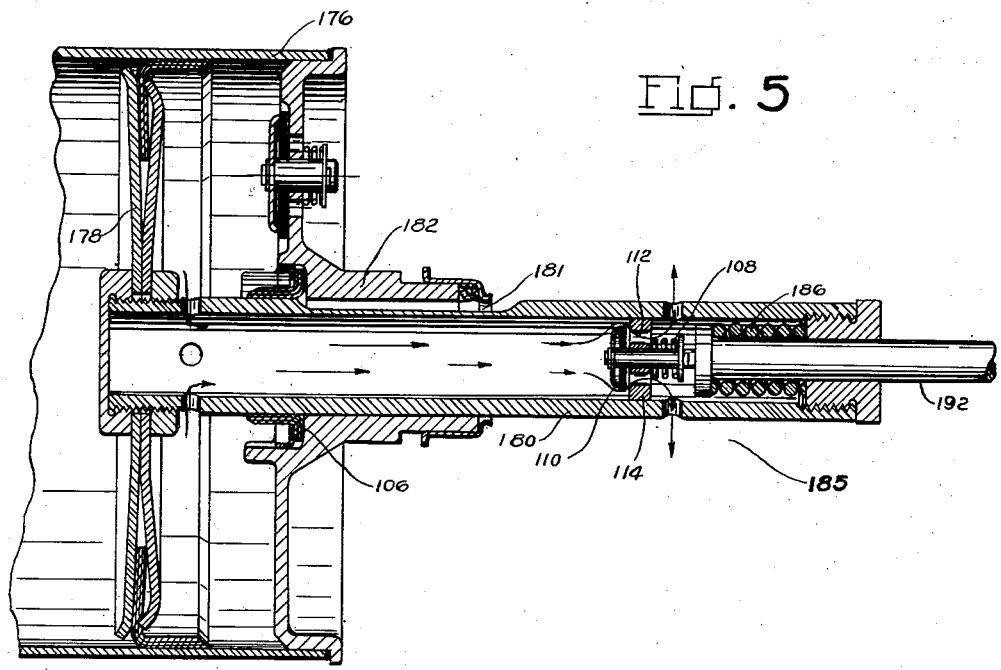
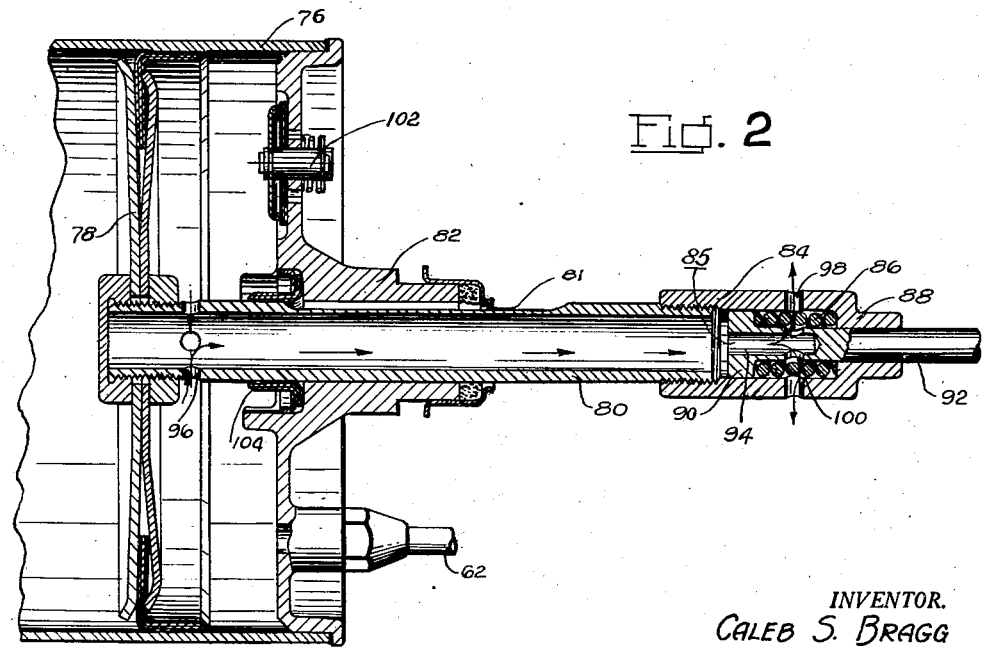
INVENTOR.
CALEB S. BRAGG
BY H.O.Clayton
ATTORNEY.

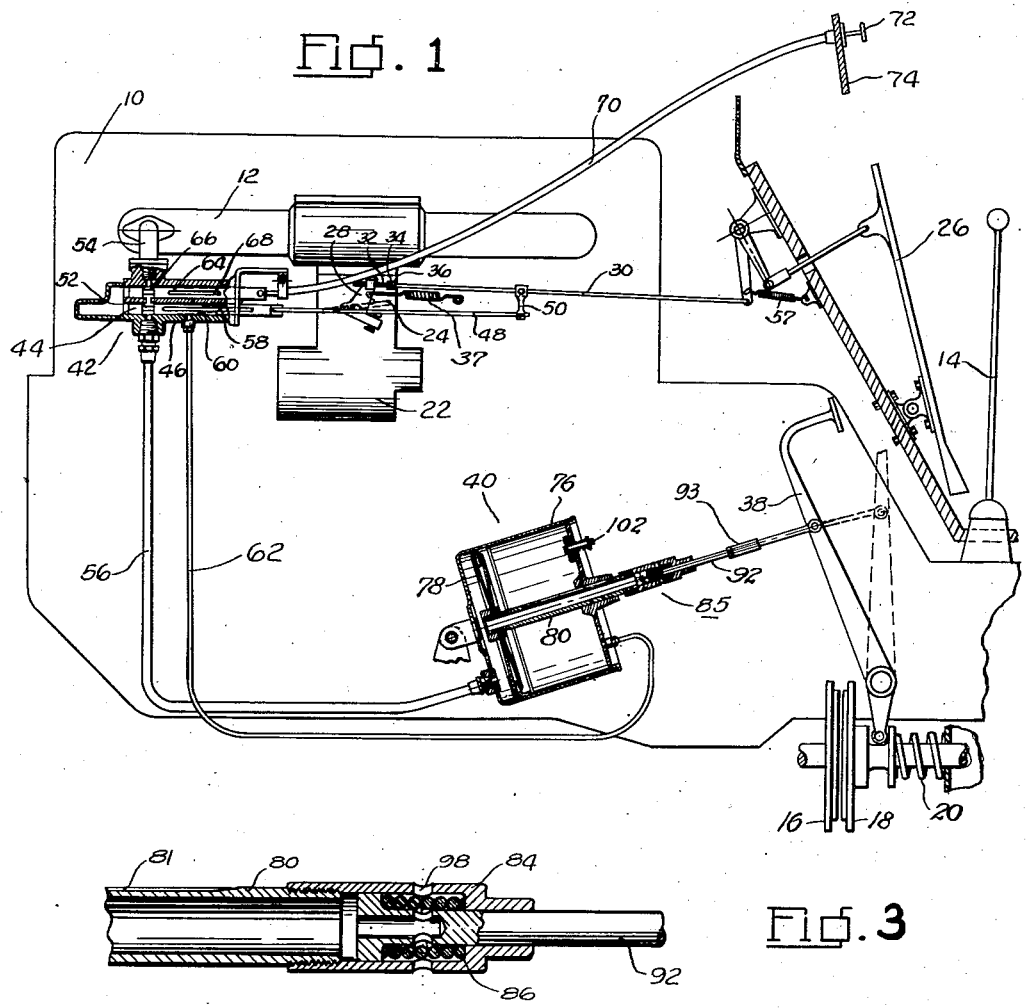
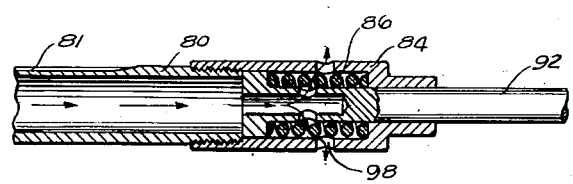
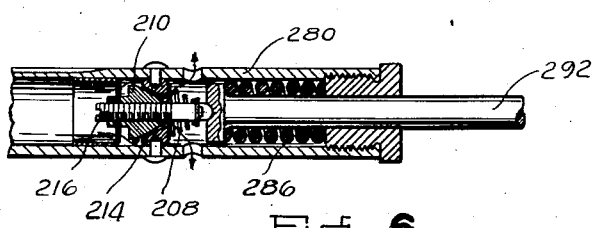

Oct. 15, 1940.  C. S. BRAGG  2,217,940

CLUTCH CONTROL MECHANISM

Filed Nov. 19, 1932  3 Sheets-Sheet 3

INVENTOR.
CALEB S. BRAGG
BY H. O. Clayton
ATTORNEY.

Patented Oct. 15, 1940

2,217,940

UNITED STATES PATENT OFFICE 2,217,940

CLUTCH CONTROL MECHANISM

Caleb S. Bragg, Palm Beach, Fla., assignor to Bendix Aviation Corporation, South Bend, Ind., a corporation of Delaware Application November 19, 1932, Serial No. 643,499

19 Claims. (Cl. 192—.01)

This invention relates in general to mechanism for operating the clutch of an automotive vehicle, and more particularly to a vacuum operated power means controlled by the accelerator of the vehicle to successively effect a disengagement and an engagement of the clutch with release and depression of the accelerator, respectively.

The invention is particularly concerned with automatically operable parts of said power means, said parts cooperating with manually operated parts of the power means to control the engagement of the clutch to accurately simulate the corresponding conventional manual operation of the clutch in effecting an engagement thereof.

More specifically, it is an object of the invention to provide means, automatically operable, when the driving and driven plates of the clutch are pressed into engagement at a predetermined load, to effect a relatively rapid and preferably progressively variable movement of the driven clutch plate to the end that the elapsed time in bringing the plates into full driving engagement may be reduced to a minimum. The suggested improvement is particularly desirable with a clutch structure wherein there is an appreciable amount of throw of the driven clutch plate after the clutch plates have been initially contacted, said throw being necessary to effect a complete and firm driving contact between the plates; for without the incorporation of the means for expediting the complete driving engagement of the plates there would result an undue amount of slipping of the clutch plates. The improvement is also advantageous in providing means, automatically operable at a predetermined clutch plate load, to speed up the engagement of the clutch, and such load is preferably so determined as to limit the acceleration of the vehicle to a degree that obviates anything but a smooth action of the vehicle in getting the same under way or increasing its speed after a free wheeling operation.

To the above end there is provided a double-ended pressure differential operated motor, preferably of the vacuum type operable by the manifold vacuum of the internal-combustion engine of the vehicle, said motor being controlled by an accelerator operated three-way valve to initiate the operations of the motor in its clutch disengaging and engaging functions. The essence of the invention, however, resides in the provision of a spring operated quick relief valve, preferably incorporated in series in the connection between the piston of the motor and the clutch mechanism, said quick relief valve cooperating with other valve means, incorporated in the motor structure, and controlled in part by the accelerator to determine the mode of operation of the driven clutch plate as the clutch is being engaged.

Restating the above, it is an object of the invention to provide a power operated clutch controlling mechanism, the complete clutch engaging operation of which is effected in a minimum of time, the mechanism insuring, however, a quick but nevertheless smooth start in traffic, and also insuring a quick yet smooth engagement of the clutch after a free wheeling operation and also insuring the effectiveness of the several operations thereof during the operation of the change-speed mechanism in stepping up the speed of the vehicle.

Yet another object of the invention is to provide clutch controlling mechanism that provides a relatively rapid initial movement of the driven clutch plate to take up the clearance between the plates as the clutch is being engaged, said mechanism to then momentarily slow up the movement of the driven clutch plate to minimize the rate of loading of said plate and insure the desired acceleration of the vehicle, said two stages of movement being preferably effected in part by manually operable means and in part by automatically operable means, and lastly, said mechanism, by automatically operable means, to step up the speed of movement of the driven clutch plate as the vehicle is being accelerated, and after the plates have contacted with a given force to thereby quickly complete the driving engagement of the clutch plates and avoid an excess of slipping.

Another object of the invention is to provide a connection between the movable or power element of the clutch motor and the clutch mechanism, said connection serving the double function of a force-transmitting element interconnecting the aforementioned parts and as a valve structure to control the last stage of movement of the movable motor element as the clutch is being engaged.

A still further object of the invention is to provide a clutch operating mechanism which is operative to control the engagement of the clutch in accordance with the relative R. P. M.'s of the driving and driven elements of the clutch, and to this end there is disclosed a two-part fly-ball governor mechanism, one of said parts being connected indirectly to the driving element of the clutch and the other of said parts being connected indirectly to the driven element of the clutch, said governor being operable to control the rate of change of pressure differential acting on the movable element of the clutch operating power means to the end that the rate of movement of the driven clutch element is inversely proportional to the differential of speeds of the driving and driven clutch elements.

Further objects and novel features of the invention will appear more fully hereinafter from the following description, when taken in connection with the accompanying drawings wherein there is illustrated certain preferred embodiments of the invention. It is to be expressly understood, however, that the drawings are for purposes of illustration only, and are not designed as a definition of the limitations of the invention, reference being had for this purpose to the appended claims.

In the drawings, wherein similar reference characters refer to like parts throughout the several views, Figure 1 is a diagrammatic view of a portion of an automotive vehicle embodying the present invention;

Figure 2 is a partial longitudinal section of the clutch power actuator, the movable power element of the actuator being shown in its position as the clutch plates are being engaged, the relief valve in the connection between the movable element and the clutch being shown just as it is beginning to operate;

Figure 3 is a fragmentary view of the connection between the movable element of the power actuator and the clutch, disclosing the relief valve in its closed or clutch disengaged position indicated in general in Figure 1;

Figure 4 is a view similar to Figure 3, disclosing the relief valve in its fully opened position;

Figure 5 is a view similar to Figure 2, disclosing a modified form of relief valve similar, however, in operation to the valve of Figure 2;

Figure 7:
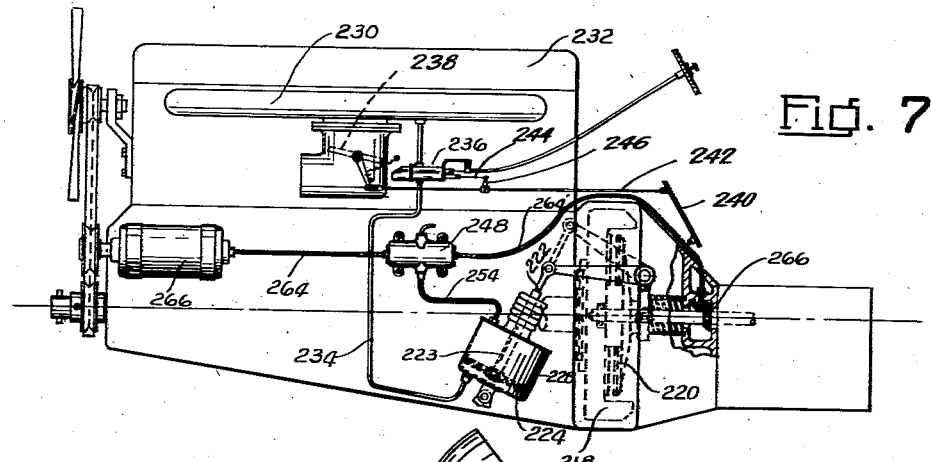
Figure 8:
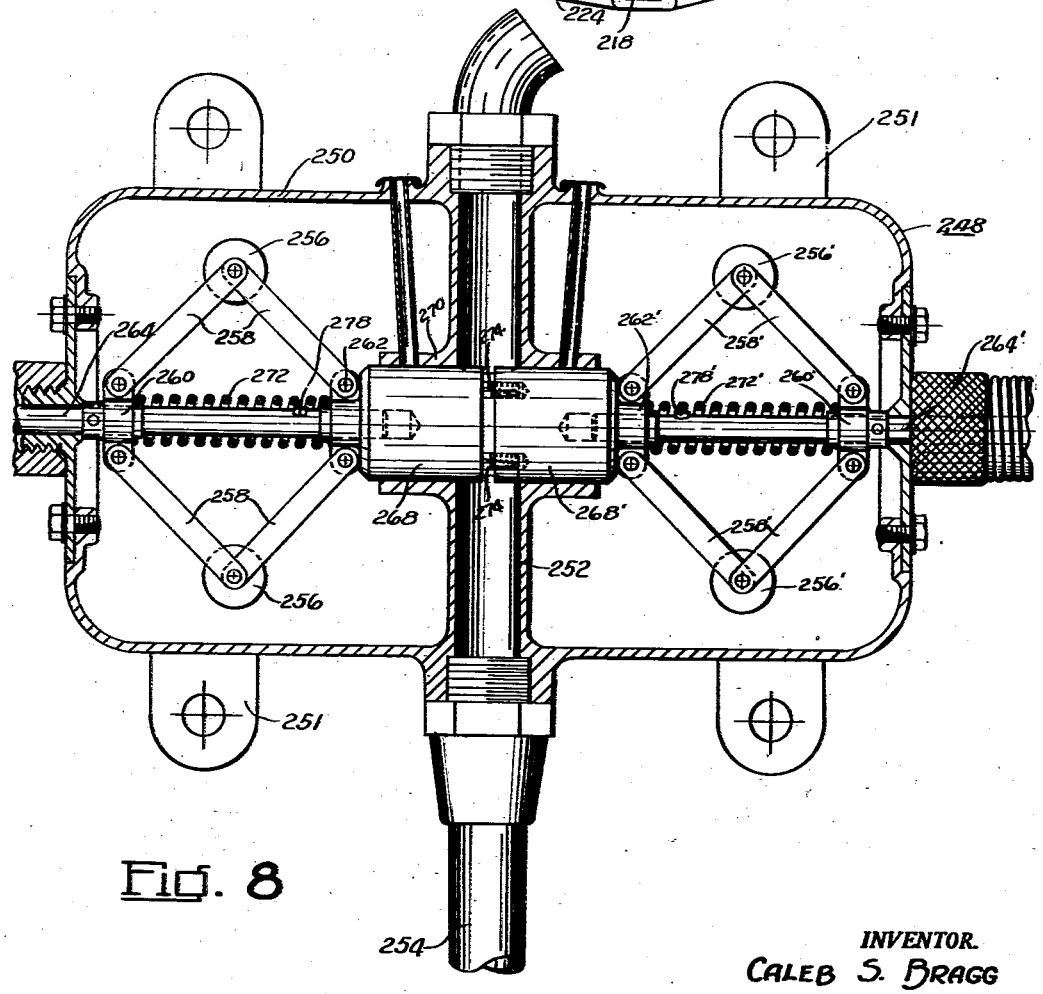

Figure 6 discloses in fragmentary section a modified form of the valve of Figure 5;

Figure 7 is a diagrammatic view of a modified form of power operated clutch controlling mechanism; and Figure 8 discloses, in enlarged section, the governor mechanism of Figure 7.

Referring more particularly to Figure 1 disclosing a preferred embodiment of the invention, there is shown a portion of an automotive vehicle embodying the present invention comprising an internal-combustion engine 10 having a throttle controlled intake manifold 12, said engine being adapted to be drivably connected to a change-speed transmission and drive shaft, not shown, said transmission being controlled by an associated operating lever 14, there being provided a clutch comprising driving and driven friction elements 16 and 18, respectively, and a spring 20, said clutch being interposed between the engine and transmission, as will be understood by those skilled in the art.

In order to supply an explosive mixture to the engine 10, a carburetor 22 communicates with the intake manifold 12, the amount of explosive mixture to said manifold being controlled by suitable throttle connections, including a throttle valve 24 and an accelerator pedal 26, the said valve and pedal being interconnected by means of a lever arm 28 secured to the throttle valve and a link 30, there being preferably provided a lost motion connection 32 between these last two named members, effective by permitting a limited amount of sliding movement between the cooperating end portions thereof, the extent of such movement being adjustable by means of stop nuts 34 and 36 for a purpose which will appear more fully hereinafter. A suitable clutch actuating element comprising a pedal member 38 is provided for manually engaging and disengaging the clutch, and in accordance with well-known practice such an element is positioned adjacent the usual manually operable vehicle control members, including the accelerator 26, in order to be within easy reach of the operator.

Means are provided by the present invention for securing selective disengagement of the clutch, including the so-called free wheel effect or coasting of the vehicle, such means thereby obviating the necessity of manual operation of the clutch actuating element 38 during operation of the selective gear transmission by movement of the lever 14. As shown, such means comprises a clutch power actuating device 40 operable by fluid pressure, such as, for example, by the reduced pressure or partial vacuum obtainable from the intake manifold 12, the communication between the manifold and the power actuator being controlled by a valve mechanism 42 operated in accordance with the throttle actuating connections in such a manner that when the accelerator 26 is in neutral or retracted position, as disclosed in Figure 1 of the drawings, the valve will establish communication between the intake manifold and the power actuator to effect a clutch disengaging operation of the latter, as disclosed in Figure 1, while when the accelerator is depressed the valve will cut off such communication and vent the actuator to atmosphere whereupon the clutch will be engaged by means of the usual clutch return spring 20.

In order to provide the aforementioned selectively controlled communication between the intake manifold and the power actuator and between the latter and the atmosphere in accordance with the position of the accelerator pedal, the valve mechanism 42, heretofore referred to and shown in detail in Figure 1, embodies a piston valve member 44 slidably mounted within a bore in a valve casing 46, said piston member being operably connected at its end to a link 48, the latter being connected by a link 50 with the throttle controlling link 30. The piston element 44 of the valve is provided with a recess 52 to intercommunicate conduits 54 and 56, connected respectively to the manifold and actuator, when the accelerator is completely released, and said piston element is further provided with atmospheric slots 58 and 60, the former intercommunicating the power actuator with the atmosphere when the accelerator is depressed and the latter being of tapered section and interconnecting the actuator, via a bleed conduit 62, with the atmosphere to a degree depending on the extent of depression of the accelerator pedal, all as will be more fully described hereinafter.

There is also provided a cut-off valve incorporated in the valve casing, said cut-off valve comprising a plunger member 64, recessed at 66 and 68 to intercommunicate the actuator with the manifold and with the atmosphere, respectively, depending upon the position of the piston within the casing. When it is desired to cut out the power actuator, the plunger member 64 is moved to the left, Figure 1, by means of a Bowden control 70 operable at 72 from the dash 74 of the vehicle, thus intercommunicating atmospheric slot 68 in the cut-off valve plunger with the conduit 56 leading to the actuator.

Referring more particularly to Figures 1 and 2, the power mechanism further includes a power actuator comprising a cylinder 76 having a reciprocable piston 78 therein, the latter being provided with a hollow piston rod 80 slotted at 81, said rod being slidable through a bushing or sleeve 82 and being rigidly connected at one end to the piston and threadedly connected at the other end with a union 84.

The union 84 provides a part of a valve construction 85 constituting the key element of the invention, said valve construction further comprising a normally open helical spring 86 interposed between a shoulder 88 at one end of the union 84 and a shoulder 90 at the extreme end of a rod 92, the latter connected to the clutch operating pedal or lever 38 at its other end to complete the connection between the piston 78 and the pedal. The rod 92 is preferably provided with an adjustable connection 93 to regulate the length of the rod, and the aforementioned construction is further characterized by the strength of spring 86, the same being made appreciably weaker than the clutch spring 20 for a purpose to be described in detail hereinafter. The rod 92 is hollow at its end at 94, and the rod 80, the union and the rod 92 are provided with openings 96, 98 and 100, respectively, to thereby provide a regulated air transmitting conduit extending between the interior of the compression end or right compartment of the actuator 40 and the atmosphere via the openings 100, the interior of the rod 80, the hollow portion 94 of the rod 92, the interstices between the coils of the spring 86 and the openings 98 in the union. The rate of egress of air from the actuator via said conduit is obviously dependent upon the degree of opening of the helical spring 86, which thus acts as a valve, the operation of which will be described in greater detail hereinafter. It is also to be noted that the parts of the valve 85 constitute force-transmitting elements in the connection between the piston 78 and the driven clutch plate and are operable as such during both the disengagement and engagement of the clutch either by power or by the unaided physical effort of the driver.

Describing now the operation of the power mechanism, with the starting of the engine, the accelerator being in its valve operating released position, the left compartment of the actuator is evacuated by virtue of its connection with the then evacuated manifold 12, thus drawing the piston 78 to the left under the action of the atmosphere admitted through a check valve 102 in the actuator. As the piston is moved to the left under the load of the atmosphere the helical valve spring 86 is first compressed, the same being made weaker than the clutch spring 20 as above described. After the spring 86 is compressed, as disclosed in Figures 1 and 3, the moving piston rod 80 picks up the rod 92 to thus disengage the clutch. The change-speed transmission may then be placed in low gear, preparatory to starting the car, whereupon the accelerator is depressed, the first increment of movement thereof serving to operate the valve 42 to vent the left compartment of the actuator to atmosphere and initiate the clutch engaging movement of the piston. Subsequent further depression of the actuator serves, of course, to open the throttle to speed up the engine, the aforementioned sequence of operations being effected by virtue of the lost motion connection 32 in the throttle linkage.

The piston 78 first moves relatively rapidly to the right, this first stage of movement being determined, as to rate, by the rate of egress of air from the compression end of the actuator via the slot 81 in the rod 80. The rod 92 is preferably so adjusted as to length that the clutch plates are just at the point of contacting when the end of the slot is about to be covered by a gasket or gland 104 in the bushing 82 of the actuator. Such an adjustment provides for the aforementioned relatively rapid movement of the driven clutch plate to quickly take up the clearance between the plates. The slot 81 and the sleeve 82 together form a valve structure built into the actuator and automatically operated to determine the first stage of movement of the driven clutch member.

The driven plate then continues to move to the left, under the action of the clutch spring, bringing the plates into driving engagement, the rate of movement and the corresponding progressively increasing clutch plate load being determined by the rate of efflux of air via the tapered bleed valve slot 60 in the accelerator operated control valve 42. The bleed slot is so shaped and adjusted that with a slight opening of the throttle, and the corresponding slight movement of the valve plunger 44, as for example in starting the car in low gear, there is a relatively small depth of slot exposed to the atmosphere. The rate of bleed of air, via the conduit 62 and the valve slot 60, and the concomitant rate of movement of the driven clutch plate are thus functions of the depression of the accelerator: in starting the car the driven clutch plate is, with the disclosed construction, moved relatively slowly to effect a slipping clutch and consequently a smooth start, and with the transmission in second and high gears the plate is moved more quickly into engagement, for with these operations the throttle is usually opened much wider than in starting the vehicle.

With many cars, however, the distance which the clutch pedal must travel to complete the driving engagement of the plates is quite appreciable, this effect being caused, for example, by a relatively high leverage in the connection between the clutch pedal 38 and driven clutch plate. With the mechanism thus far described it might well be that entirely too much time would be consumed in completing the engagement of the plates, thus causing an undue slipping of the clutch and delay in getting the vehicle under way. However, the heretofore described valve construction in the connection between the piston 78 and the driven clutch plate obviates this result by stepping up the movement of the driven plate after the plates have been pressed into engagement sufficiently to permit the spring 86 to expand and thus automatically provide a second means of escape of air from the actuator.

The relative strengths of the clutch and valve springs 20 and 86, respectively, and the remaining parts of the mechanism are preferably so proportioned that the valve 85, which may be described as a quick relief valve, does not function until the vehicle has been effectively accelerated as a result of the accelerator operation of the bleed valve 60, for it is a particular object of the invention to avoid any grabbing of the clutch with the consequent jerking and excessive acceleration of the car. The parts are so adjusted as to limit the aforementioned acceleration to a factor which will be unobjectionable to the passengers of the vehicle at all times during the operation thereof. When the clutch plates have been loaded to the predetermined maximum, depending upon the aforementioned adjustments, the spring 86 then automatically opens, as just described, permitting a relatively quick dump of air from the actuator via the openings between the coils of the spring. The driven plate is then quickly moved into firm contact with the driving plate to complete the engagement of the clutch, all slipping of the clutch plates automatically ceasing.

It is to be particularly noted that the rate of efflux of air via the valve 85, with the consequent rate of increase of clutch plate load, progressively increases as the spring opens wider and wider, thus accelerating the aforementioned last stage of movement of the clutch plate.

Figures 1 and 3 disclose the relief valve parts in their clutch disengaged position with the coils of the spring 86 closed tight; Figure 2 discloses the position of the parts just after the rapid movement of the driven plate has been completed by the covering of the slot 81, and after the bleed valve has functioned as the sole means of escape of air from the actuator, the coils of the valve spring being shown as just beginning to open to permit the quick engagement function of the valve; Figure 4 discloses the coils of the valve fully opened.

There is disclosed in Figure 5 a modified form of actuator and quick relief valve structure wherein the bleed conduit is dispensed with, the bleed function heretofore described being effected by the leaks in the actuator. The relative adjustment of the contacting point of the clutch plates and the end of a slot 181 in the piston rod with respect to a gland 106 must be determined as indicated in describing the corresponding structure of Figure 2, that is the clutch plates are just about to contact when the gland is about to cover the end of the slot. The piston rod will, however, undoubtedly continue to move slightly to the right after the slot has been covered in view of the inertia of the parts, thereby cracking the relief valve and initiating its operation. The actuator here described comprises a casing 176, piston 178, end wall and bearing 182 and hollow rod 180, all similar to the structure of Figure 2. The relief valve structure 185 differs in that with the opening of a spring 186, imparting relative movement between rod 180 and a rod 192, a valve spring 108 is compressed to unseat a valve member 110, thus exposing openings 112 in a valve member 114 having a shrink fit in the rod 180 and permitting an escape of air as indicated by the arrows, Figure 5. The operation of the valve 185 is thus the same as that of the coil spring valve member in the modification of Figure 2.

In Figure 6 there is disclosed a modification of the relief valve structure of Figure 5 wherein relative movement of rods 280 and 292, effected by means of a spring 286, serves to compress a valve spring 208 to unseat a tapered valve member 210. The feature of this particular form of relief valve structure lies in the adjustability of the valve member 210 with respect to a fixed valve element 214, the tapered valve member 210 being threadedly mounted on a stem 216. The rate of egress of air may thus be varied according to the adjustment of the valve member 210 on the stem 216.

In Figures 7 and 8 there is disclosed automatically operable means for controlling the rate of engagement of the clutch in accordance with the relative speeds of the clutch members. Such a means has particular utility in a power operated clutch controlling mechanism of the type heretofore described, for it is apparent that, when the R. P. M.'s of the driving and driven clutch plates are equal or substantially equal, there is no particular need to cushion the engagement of the clutch, that is slow up the movement of the driven clutch plate as it moves into engagement with the driving plate.

In the embodiment of Figure 7 there is disclosed a conventional clutch comprising driving and driven members 218 and 220, respectively, the driven member 220 being operably connected by a connecting rod 222, slotted at 223, to a moveable piston element 224 of a double-ended vacuum operated power actuator, the cylinder element 228 of which is placed in fluid transmitting connection with a manifold 230 of an internal-combustion engine 232 by means of a conduit 234. A combined three-way and cut-out control valve unit 236 is interposed in the conduit 234, the structure and its mode of operation being similar to the mechanism disclosed in Figure 1 with the exception that the bleed valve slot 60 in Figure 1 is dispensed with. The structure is in all other respects similar to that disclosed in Figure 1, a throttle valve 238 being connected to an accelerator 240 by a link 242, the link 242 being connected to the clutch control valve by links 244 and 246 so that the power means for operating the clutch may be controlled by the accelerator.

The rate of efflux of air from the compression or pressure side of the actuator determines the rate of movement of the driven clutch plate as it approaches its final driving position in full contact with the driving plate, and such efflux rate is automatically controlled by a governor operated valve unit 248 of Figure 7, the same being disclosed in detail in Figure 8.

The governor unit preferably comprises a one-piece casing member 250, bracketed to the chassis by fastening means 251, said member being provided with a tube or duct portion 252 dividing the casing generally into two parts, each housing a valve operating fly-ball governor mechanism: The tube 252, housing a bleed valve mechanism to be described hereinafter, serves as a part of a bleed conduit 254 connected to the compression end of the cylinder 228. The governor on the left side of the unit 248 preferably comprises inertia ball members 256 connected by links 258 to sleeves 260 and 262, sleeve 260 being keyed to a drive shaft 264, preferably driven by a generator 266, and sleeve 262 being secured to a bleed valve plunger member 268. The plunger 268 is preferably slidably mounted within a tubular hub portion 270 of the duct 252. Sleeve 262 and its connected plunger member 268 are preferably slidably mounted on the end of the drive shaft 264 and are at all times urged toward the tube 252 by a compressed spring 272 interposed between the two sleeve members. The governor mechanism just described is duplicated in the right compartment of the casing, the reference numerals being the same with the addition of a prime. Plugs 274 are preferably mounted within one or the other of the plunger members and serve as adjustable stop means to determine the width of the space between the plungers, when the same are each urged by springs 272 and 272' into contact one with another. The drive shaft 264' is preferably drivably connected with the driven clutch member through the intermediary of conventional bevel gears 266. Both of the fly-ball governor structures are so connected with the driving and driven elements of the clutch as to reflect the speeds of said elements, the R. P. M.'s of the governors being directly proportional to the R. P. M.'s of the clutch elements.

Describing now the operation of the aforementioned mechanism, with both of the clutch plates static, that is with the car parked and the engine dead, the springs 272 and 272' urge the plunger 268 and the plunger 268' into engagement. When the engine is cranked and is turning over at its idling speed, plunger 268 of the engine operated fly-ball governor tends to move to the left under the inertia effect of the balls 256: however, the spring 272 is made strong enough to offset this effect with the result that the plunger is held stationary at the idling speed of the engine, this feature being of importance for a reason which will be brought out in the description to follow.

The transmission is now placed in low gear preparatory to starting the car, the clutch being at this time disengaged by virtue of the release of the accelerator, all as previously described in connection with the operation of the mechanism of Figure 1. Depression of the accelerator serves both to open the throttle and to initiate the clutch engaging operation of the actuator as described, the first stage of movement of the driven element of the clutch being relatively rapid by virtue of the efflux of air from the actuator via the slot 223 in the connecting rod 222. The last stage of movement of the clutch plate is determined by the rate of efflux of the air remaining in the pressure end of the actuator, and this rate is governed by the degree of separation of the plungers 268 and 268'. The R. P. M. of the engine progressively increases as the throttle is opened to increase the engine torque preparatory to engaging the clutch in low gear, and the plunger 268 is moved to the left contacting a stop 278, said stop determining a position of the governor at an R. P. M. considerably less than the maximum R. P. M. developed during the ordinary operation of the engine. As the plunger 268 moves to the left the plunger 268' also moves to the left under the action of the compressed spring 272', thus maintaining the minimum opening between the plungers.

Continuing the description of the sequence of operations of the mechanism, the driven clutch plate 220 then moves slowly into contact with the driving plate 218 by virtue of the minimum bleed provided by the plungers, this action resulting in the desired smooth start of the vehicle. As the driven plate begins to rotate the driven clutch plate operated governor mechanism functions to move the plunger 268' to the right to increase the distance between the plungers, and accordingly increase the rate of movement of the driven clutch plate to complete its driving engagement and obviate all unnecessary slipping of the plates. The rate of movement of the driven plate thus progressively increases as the R. P. M. of the driven plate increases, and it is also to be noted that the distance between the plungers, determining the rate of movement of the driven clutch plate, progressively increases as the differential in R. P. M.'s between the clutch plates decreases, assuming the aforementioned maximum governor effect, the sleeve 262 being positioned against the stop 278.

After the speed of the vehicle has been sufficiently increased in low gear, there follows the usual second and high gear changing operations of the transmission. During these operations the clutch plates move into engagement relatively quickly, inasmuch as the engine driven plunger 268 is moved to its extreme left position, determined by the stop 278, by virtue of the relatively high R. P. M. of the driven clutch plate reflecting the fly-wheel effect of the engine as the accelerator is momentarily released and depressed during the aforementioned gear shifting operations. The plunger 268' is at this time also in its extreme right position, the same being contactable with its stop 278, preferably determining an R. P. M. of the driven clutch plate, with the transmission in second gear and the vehicle moving at a speed developed by the average driver in accelerating the vehicle in low gear. This R. P. M., however, is considerably lower than the maximum R. P. M. developed during a conventional operation of the vehicle as the speed of the same is increased. It follows therefore that the clutch is engaged very quickly during the aforementioned gear shifting operations by virtue of the maximum degree of opening between the plungers.

After the vehicle is under way in high gear the clutch may be disengaged to effect the well-known free wheeling or coasting action of the vehicle. So far as the governor mechanism is concerned the operation is exactly the reverse of its operation in starting the car in motion, all as previously described. In the free wheeling operation the accelerator is usually released for a sufficient length of time to drop the R. P. M. of the engine to its idling speed, and in that event the spring 272 maintains the plunger 268 in contact with the stops 274 to provide for a minimum opening between the plungers. The plunger 268' is at this time in its maximum R. P. M. position against its stop 278' by virtue of the then existing relatively high speed of the vehicle. When it is desired to reengage the engine with the drive shaft, either to use the engine as a brake in descending a grade or to increase the speed of the vehicle, the driver usually tramps upon the accelerator, thus quickly increasing the engine speed to a degree sufficient to at least bring the R. P. M. of the driving clutch plate up to that of the driven plate; the plunger 268 thus quickly moves to its maximum R. P. M. position against its stop 278, and a maximum bleed is insured to provide a rapid engagement of the clutch.

There is thus provided a governor mechanism reflecting in its operation the relative R. P. M.'s of the clutch elements under all conditions of service, and providing an automatically operable means to insure a clutch engaging operation of a vacuum operated power means that accurately simulates the corresponding manual operation of the clutch.

I claim:

1. In an automotive vehicle comprising a clutch having driving and driven members, a pressure differential operated power means having its movable power element connected to the driven member of said clutch, means for controlling the pressure differential acting on said power element, said means comprising means automatically operable, when and if the driving and driven members of the clutch are pressure loaded to a predetermined degree, to vary said pressure differential to expedite the operation of engaging the clutch.

2. In an automotive vehicle comprising a clutch having driving and driven members, a pressure differential operated power means having its movable power element connected to the driven member of said clutch, means for controlling the pressure differential acting on said power element, said means comprising means automatically operable, when and if the driving and driven members of the clutch are pressure loaded to a predetermined degree, to vary said pressure differential to expedite the operation of engaging the clutch, said automatically operable pressure differential control means comprising a valve member incorporated in the connection between the aforementioned power element and the driven clutch member.

3. In an automotive vehicle comprising a clutch having driving and driven members, a pressure differential operated power means having its movable power element connected to the driven member of said clutch, means for controlling the pressure differential acting on said power element, said means comprising means automatically operable, when and if the driving and driven members of the clutch are pressure loaded to a predetermined degree, to vary said pressure differential to expedite the operation of engaging the clutch, said automatically operable pressure differential control means comprising a valve member incorporated in the connection between the aforementioned power element and the driven clutch member, said valve constituting a combined force-transmitting element and valve member and comprising relatively movable members including a spring member.

4. In an automotive vehicle provided with a clutch comprising driving and driven members, fluid pressure operated power means for disengaging the clutch and controlling the engagement thereof, said power means comprising a valve automatically operable, when the driving and driven members of the clutch are loaded to a predetermined degree, to vary the fluid pressure of said power means to thereby increase the rate of engagement of the clutch.

5. In an automotive vehicle provided with a clutch comprising driving and driven members, fluid pressure operated power means for disengaging the clutch and controlling the engagement thereof, said power means comprising a connection interconnecting the driven element of the clutch with the power element of said power means, said connection including a valve member, operable in accordance with the degree of tension of said connection, to automatically vary the fluid pressure of said power means and thereby increase the rate of engagement of the clutch.

6. In an automotive vehicle provided with a clutch comprising driving and driven members, fluid pressure operated power means for disengaging the clutch and controlling the engagement thereof, said power means comprising a connection interconnecting the driven element of the clutch with the power element of said power means, said connection including a valve member, operable in accordance with the degree of tension of said connection, to vary the fluid pressure of said power means to thereby increase the rate of engagement of the clutch, said valve comprising relatively movable rigid parts of said connection and also including a yieldable member interposed between said rigid parts.

7. In combination with a power actuated automotive clutch having driving and driven members, power means for disengaging said clutch members and controlling the engagement thereof, said power means comprising means automatically operable, at or above a given loading of the clutch members, to increase the rate of movement of the driven clutch member as it moves into engagement with the driving member to thereby expedite the completion of the clutch engaging operation of said power means.

8. In combination with a power actuated automotive clutch having driving and driven members, power means for disengaging said clutch members and controlling the engagement thereof, a connection interconnecting said power means with the driven clutch member, said power means comprising means interposed in the aforementioned connection and automatically operable, at or above a given loading of the clutch members, to increase the rate of movement of the driven clutch member as it moves into engagement with the driving member to thereby expedite the completion of the clutch engaging operation of said power means.

9. In combination with a power actuated automotive clutch having driving and driven members, power means for disengaging said clutch members and controlling the engagement thereof, said power means comprising a combined tension element and valve, forming a part of the connection between the power means and the driven clutch element and automatically operable, at or above a given loading of the clutch members, to increase the rate of movement of the driven clutch member as it moves into engagement with the driving member to thereby facilitate the completion of the clutch engaging operation of said power means.

10. In an automotive vehicle provided with a clutch comprising driving and driven members, pressure differential operated power means for disengaging the clutch and controlling the engagement thereof, said power means comprising an actuator comprising a double-ended cylinder and a piston reciprocable therein, a connection interconnecting the piston with the driven clutch member, valve means for controlling the gaseous pressure within one end of the cylinder, and other valve means, including a valve incorporated in the aforementioned connection, for controlling the gaseous pressure within the other end of the cylinder.

11. In an automotive vehicle provided with a clutch comprising driving and driven members, pressure differential operated power means for disengaging the clutch and controlling the engagement thereof, said power means comprising an actuator comprising a double-ended cylinder and a piston reciprocable therein, a connection interconnecting the piston with the driven clutch member, valve means for controlling the gaseous pressure within one end of the cylinder, and other valve means, including a valve incorporated in the aforementioned connection, for controlling the gaseous pressure within the other end of the cylinder, said last mentioned valve comprising a yieldable member functioning both as a control valve and as a force-transmitting element in said connection.

12. In an automotive vehicle provided with a clutch comprising driving and driven members, and further provided with an accelerator controlled engine, pressure differential operated power means for disengaging the clutch and controlling the engagement thereof, said power means comprising an actuator comprising a double-ended cylinder and a piston reciprocable therein, a connection interconnecting the piston with the driven clutch member, valve means operable by the accelerator for controlling the gaseous pressure within one end of the cylinder, and other valve means, including a valve incorporated in the aforementioned connection, for controlling the gaseous pressure within the other end of the cylinder.

13. In an automotive vehicle provided with a clutch comprising driving and driven members, pressure differential operated power means for disengaging the clutch and controlling the engagement thereof, said power means comprising an actuator, including a double-ended cylinder and a piston reciprocable therein, a connection interconnecting the piston with the driven clutch member, valve means for controlling the gaseous pressure within one end of the cylinder to initiate the clutch disengaging and clutch engaging operations of said actuator, and a plurality of valves, including a valve incorporated in the aforementioned connection, for controlling the gaseous pressure within the other end of the cylinder, said plurality of valves providing three distinct stages of movement of the driven clutch member as it moves into engagement with the driving clutch member, the first stage of movement being relatively fast, the second stage relatively slow, and the last stage of movement relatively fast to expedite the completion of the engagement of the clutch after the clutch plates are in driving engagement one with the other.

14. In an automotive vehicle provided with a clutch having a driven member, a vacuum operated double-ended power actuator operably connected to said driven member by tension means, said means including a quick relief valve, valve means for controlling the degree of vacuum within one end of said actuator, and other valve means, cooperating with said quick relief valve, for controlling the degree of gaseous pressure within the other end of said actuator to thereby control the mode of movement of said driven clutch member as the clutch is being engaged.

15. In an automotive vehicle provided with an internal-combustion engine, a clutch having driving and driven members, the driving member being drivably connected to said engine, a throttle for said engine, an accelerator for operating said throttle, a vacuum operated power actuator operably connected to said driven member, an accelerator operated control valve for said actuator, and other valve means, in part operated by said accelerator and cooperating with said aforementioned valve means, for controlling the engagement of the clutch, said last mentioned valve means comprising a quick relief valve operable to expedite the engagement of the clutch when and if the clutch members are loaded to a predetermined degree.

16. In an automotive vehicle provided with a clutch comprising a driven member, a double-ended fluid pressure operated power actuator, the power element of which is connected to said driven member, valve means for controlling the gaseous pressure within one end of said actuator, and a plurality of valve members for controlling the gaseous pressure within the other end of the actuator to determine the mode of movement of the driven member as the clutch is being engaged, said latter valves comprising one valve built into said actuator for effecting a relatively rapid first stage of movement to said driven member, and further comprising a second valve for then effecting a relatively slow second stage of movement of the driven clutch member, and further comprising a third valve, in the nature of a quick relief valve, for speeding up the movement of the driven clutch member to provide a relatively rapid third stage of movement of said clutch member and expedite the engagement of the clutch.

17. In an automotive vehicle provided with a throttle controlled accelerator, and further provided with a clutch comprising a driven member, a double-ended fluid pressure operated power actuator, the power element of which is connected to said driven member, valve means for controlling the gaseous pressure within one end of said actuator, and a plurality of valves for controlling the gaseous pressure within the other end of the actuator to determine the mode of movement of the driven member as the clutch is being engaged, said latter valves comprising one valve built into said actuator for effecting a relatively rapid first stage of movement to said driven member, and further comprising a second valve, operable by and in accordance with the position of the accelerator, for then effecting a relatively slow second stage of movement of the driven clutch member, and further comprising a third valve, in the nature of a quick relief valve, for speeding up the movement of the driven clutch member to provide a relatively rapid third stage of movement thereto, and thus expedite the engagement of the clutch.

18. In a clutch controlling mechanism for an automotive clutch, a power actuator operably connected to the driven element of the clutch by tension means, and valve means incorporated as a part of said means for controlling the clutch engaging operation of said power actuator, said valve means comprising a helical spring member incorporated as a force-transmitting element in said tension means and operable, according to the degree of opening of its coils, to vary the mode of operation of the power actuator.

19. In a clutch controlling mechanism for an automotive clutch, a power actuator operably connected to the driven element of the clutch by tension means, said tension means comprising a plurality of interconnected elements, valve means comprising a plurality of interconnected elements, valve means housed within said tension means, and valve operating means incorporated as a part of said tension means for controlling the operation of said valve means, said valve operating means comprising a spring member forming a force-transmitting element in series with certain of the aforementioned interconnected elements, said valve means comprising relatively movable valve members rendered operable with the expansion and contraction of said spring.

CALEB S. BRAGG.